(12) United States Patent
De Champeaux et al.

(10) Patent No.: US 8,387,910 B2
(45) Date of Patent: Mar. 5, 2013

(54) ROTARY SEAL

(76) Inventors: Charles De Champeaux, Les Alluets le Roi (FR); Philippe De Champeaux, Autun (FR)

( * ) Notice: Subject to any disclaimer, the term of this patent is extended or adjusted under 35 U.S.C. 154(b) by 645 days.

(21) Appl. No.: 12/529,263

(22) PCT Filed: Mar. 6, 2008

(86) PCT No.: PCT/FR2008/000295
§ 371 (c)(1),
(2), (4) Date: Sep. 23, 2009

(87) PCT Pub. No.: WO2008/132315
PCT Pub. Date: Nov. 6, 2008

(65) Prior Publication Data
US 2010/0090414 A1    Apr. 15, 2010

(30) Foreign Application Priority Data

Mar. 7, 2007 (FR) .................................... 07 01653
Jul. 12, 2007 (FR) .................................... 07 05062

(51) Int. Cl.
*B64C 27/04* (2006.01)
*B64C 27/18* (2006.01)
*F01D 11/02* (2006.01)
*F16J 15/16* (2006.01)

(52) U.S. Cl. ............... 244/17.11; 277/423; 277/514; 416/174

(58) Field of Classification Search ............ 244/17.11, 244/17.23; 277/423, 514; 416/20 R, 55, 416/174
See application file for complete search history.

(56) References Cited

U.S. PATENT DOCUMENTS

| | | | | |
|---|---|---|---|---|
| 2,011,206 | A * | 8/1935 | Vandermeer | 277/429 |
| 2,115,031 | A * | 4/1938 | Meininghaus | 416/174 |
| 2,994,495 | A | 8/1961 | Lubben et al. | |
| 3,259,195 | A * | 7/1966 | Chaney | 416/20 R |
| 5,135,237 | A * | 8/1992 | Flower | 277/355 |
| 5,211,541 | A * | 5/1993 | Fledderjohn et al. | 416/198 A |
| 2008/0213096 | A1 * | 9/2008 | Johnson Campino et al. | 416/174 |

FOREIGN PATENT DOCUMENTS

| | | |
|---|---|---|
| DE | 975981 C | 1/1963 |
| FR | 649065 | 12/1928 |
| FR | 996034 | 12/1951 |
| FR | 2695702 A1 | 3/1994 |
| GB | 07107 | 0/1911 |

OTHER PUBLICATIONS

International Search Report PCT/FR2008/000295; Dated Nov. 3, 2008.

* cited by examiner

*Primary Examiner* — Rob Swiatek
(74) *Attorney, Agent, or Firm* — Cantor Colburn LLP

(57) ABSTRACT

A rotary seal having first and second parts mobile relative to each other about a rotation axis. The first and second mobile parts each include an interface area having a plurality of protruding and recessed members with complementary shapes, the protruding and recessed members of one part engaging the protruding and recessed members of the other part in order to define decompression chambers with an increasing volume. The interface areas are located at a distance from each other without any friction between them.

23 Claims, 10 Drawing Sheets

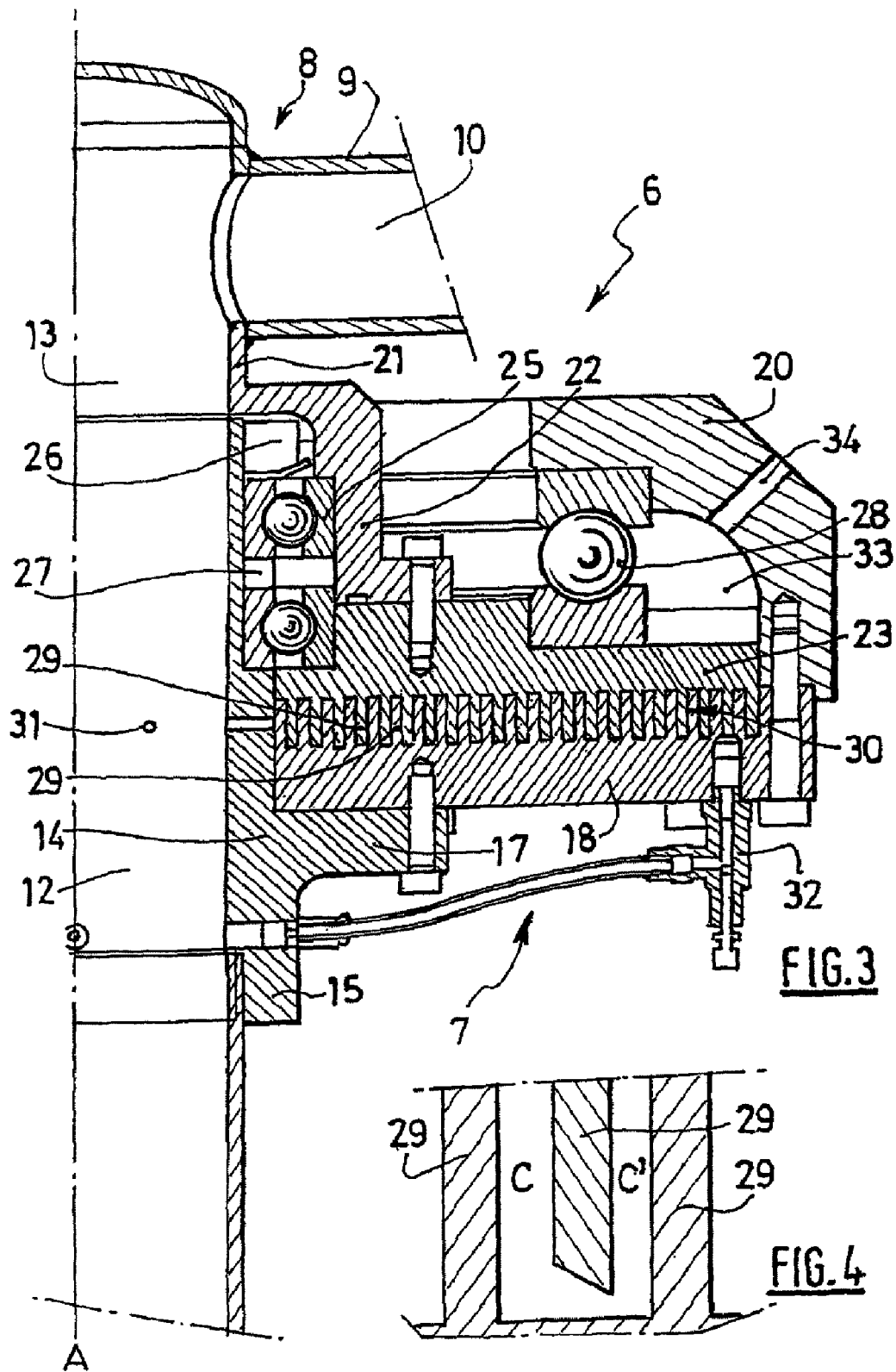

ROTARY SEAL

TECHNICAL FIELD OF THE INVENTION

The invention relates to a rotary seal, to a rotor, and to a propeller-driven craft of which the propellers are driven by the ejection of pressurized gas onto a blade of the propeller comprising such a seal, and to a turbine or a compressor also comprising such a seal.

BRIEF DESCRIPTION OF RELATED ART

Document FR 996 034 discloses a helicopter. That helicopter comprises a rotor equipped with a propeller made up of several blades. The helicopter comprises means of generating pressurized gas and gas ejection heads positioned at the ends of the blades. The ejection of the pressurized gases causes the blades to rotate and thus provides the craft with lift and propulsion.

The pressurized gases thus have to be carried from the gas generation means as far as the end of the rotationally-driven blades by a gas carrying pipe. To do that, a rotary seal is provided that ensured continuity between the moving part and the fixed part of the pipe.

Rotary seals generally comprise a first and a second part which are able to move relative to one another about an axis of rotation.

Known rotary seals are unable to tolerate high gas pressures because they are generally incapable of tolerating pressures in excess of about 4 bar. Because the lift force that supports the helicopter is directly dependent on the pressure of the ejected gases, the results obtained with a low pressure mean that the weight of the helicopter and of its payload have to be limited.

It should be noted that the same technical problem of a seal withstanding high pressures or of maintaining a controlled leak rate arises in other rotary seal applications, particularly in turbines or compressors that comprise a moving shaft passing through the wall of an enclosure delimiting a pressurized zone.

BRIEF SUMMARY OF THE INVENTION

The invention sets out to solve this technical problem by proposing a rotary seal that allows sealing or a controlled leak rate to be maintained at high service pressures.

To this end, the invention relates to a rotary seal of the aforementioned type, intended to separate a high-pressure first zone and a low-pressure second zone characterized in that the first and second parts each comprise an interface zone exhibiting a plurality of projecting and recessed elements of complementary shapes, the projecting and recessed elements of one of the parts interlocking with the projecting and recessed elements of the other part in such a way as to form decompression chambers of a volume that increases from the high-pressure zone toward the low-pressure zone, the interface zones being located some distance from one another without rubbing together.

The seal separates two zones corresponding to two distinct environments at least one of which contains a gas. One of the two environments is at a higher pressure than the second environment. The decompression chambers have a volume that increases from the higher-pressure environment toward the lower-pressure environment.

The high-pressure gases have a tendency to escape into the space delimited by the two interface zones of the moving parts.

The recessed and projecting elements of each of the two interface zones form decompression chambers of increasing volume aimed at creating individual pressure drops dependent on the profiles chosen.

The leak rate of the gases escaping is thus substantially reduced. This rotary seal makes it possible to increase the performance of the device equipped with this seal while at the same time reducing manufacturing and maintenance costs.

Advantageously, the seal comprises at least one intermediate chamber situated between two decompression chambers, of which the volume is at once greater than the preceding decompression chamber and than the following decompression chamber.

According to one option, at least one of the two parts of the seal comprises gas suction means opening into the space delimited by the two interface zones.

These arrangements make it possible to collect a residual leakage flow. These arrangements also make it possible to ensure that two environments separated by the seal are isolated from each other.

Advantageously, at least one of the two parts of the seal comprises pressurized-gas injection means opening into the space delimited by the two interface zones.

Injecting pressurized gas makes it possible to create a back pressure that further limits the leakage of pressurized gas.

Advantageously, the gas injection means are adjustable.

Advantageously, the injection means are located at the periphery of the corresponding interface zone.

This feature makes it possible to reduce the amount of gas that escapes out of the rotary seal while at the same time creating a large volume of pressurized gas between the two moving parts.

According to one embodiment, the injection means open into a groove formed in the wall of the interface zone and extending over a circumference about the axis of rotation.

This arrangement makes it possible to spread the backpressure created by the nozzle over the circumference of the interface zone.

According to one option, the gas injection means comprise deflectors located on a moving part of the seal and intended to compress the gas through a dynamic effect.

According to another option, the gas injection means comprise at least one injection nozzle.

According to one embodiment, the projecting and recessed elements are formed by annular fins between them delimiting complementary annular grooves, the fins of one of the moving parts interlocking in the grooves of the other moving part and vice versa in order to delimit the decompression chambers.

Advantageously, the fins have an edge which, with the bottom of the groove located opposite it, forms a gradual narrowing.

These arrangements make it possible to increase the pressure drop across the edge of the fin.

According to one embodiment, the walls of the decompression chambers have roughnesses.

These arrangements make it possible to increase the pressure drop in each decompression chamber.

Advantageously, the roughnesses have striations directed toward the end wall of the decompression chamber.

According to one embodiment, the interface zones extend such that they are concentric with the axis of rotation and transverse to this same axis.

These arrangements make it possible in a simple way to create a set of decompression chambers of increasing volume.

According to another embodiment, the interface zones extend such that they are parallel to the direction of the axis of rotation.

According to one embodiment, the first and second parts respectively comprise a first and a second pipe portion, these portions being arranged along the axis of rotation of the moving parts and in the continuation of one another so as to form a gastight continuous pipe intended to carry a pressurized gas.

Advantageously, the injection nozzle or nozzles are connected to one of the pipe portions.

It is thus possible in a simple way to regulate the flow of the injection nozzle as a function of the pressure of the gases flowing through the pipe.

Specifically, during use, the pressure of the gases flowing through the pipe may vary. Now, too low or too high a pressure at the injection nozzle disturbs the operation of the rotary seal. The connection thus created between the injection nozzle and the pipe carrying the gases allows the injection flow from the nozzle to be adjusted to suit without the need for any special automatic control.

Advantageously, the pressure of the gases injected by the injection means is less than 10% of the pressure of the gases flowing through the pipe portions.

According to another embodiment, the first part of the seal is secured to the wall of an enclosure delimiting an interior high-pressure first zone and an exterior second zone of lower pressure, and the second part is secured to a moving shaft passing through the wall of the enclosure.

The invention also relates to a rotor for a gas engine comprising the rotary seal as described hereinabove.

The invention also relates to a propeller-driven craft of which the propellers are driven by the ejection of pressurized gas onto a blade of the propeller, in particular a helicopter comprising a rotor as described hereinabove.

By virtue of the arrangements according to the invention, the payload that the craft can carry is increased, because the power of the engine is increased.

The invention further relates to a turbine or a compressor comprising a rotary seal as described hereinabove.

BRIEF DESCRIPTION OF THE DRAWINGS

In any event, the drawing will be clearly understood with the aid of the description which follows, with reference to the attached schematic drawing which, by way of nonlimiting example, depicts a number of embodiments of this rotary seal.

FIG. 3 is an enlarged partial view of the cross section depicted in FIG. 2.

FIG. 4 is a schematic view of the profile of a fin, in section on a plane containing the axis of rotation of the seal.

DETAILED DESCRIPTION OF THE INVENTION

Figure 1:
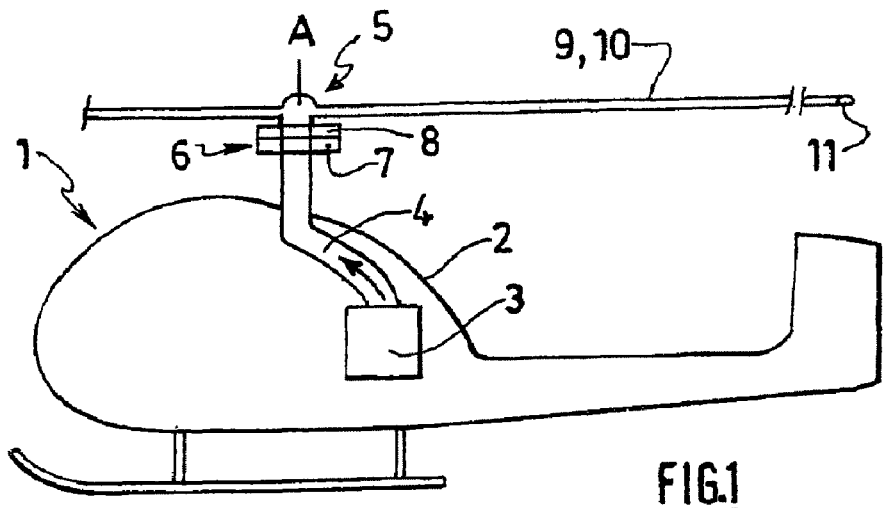
FIG. 1 is a schematic depiction of a helicopter equipped with a rotary seal according to the invention.

FIG. 1 depicts a helicopter 1 according to the invention, comprising a fuselage exhibiting a cabin 2, inside which there are means, of the turbine 3 type, of generating a pressurized gas. The pressurized gases are led into a gas-carrying pipe 4.

The helicopter 1 further comprises a rotor 5, mounted such that it can rotate on the fuselage via a rotary seal 6 comprising a fixed part 7 and a moving part 8 and via which the continuity of the pipe 4 is ensured. The rotor is fitted with blades 9 also comprising gas-carrying channels or ducts 10 connected to the rotary seal 6 and aimed at carrying the gases to the corresponding ends of the blades 9. These ends are equipped with pressurized gas ejection heads 11 that allow the blades 9 to be driven as a result of the torque applied to the rotor 5.

This type of helicopter has the advantage of not requiring a tail rotor, which tail rotor is usually needed in order to compensate for the torque applied by conventional drive of the blades. The costs of manufacturing and of maintaining this type of helicopter are therefore vastly lowered.

Figure 2:
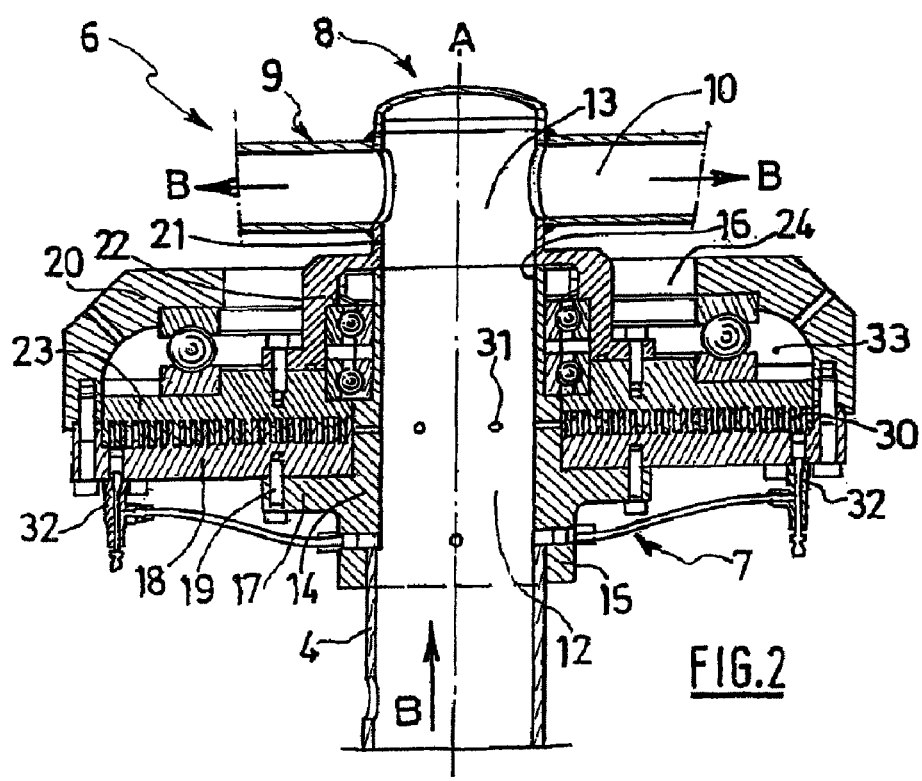
FIG. 2 is a view in longitudinal section of a rotary seal.

More particular interest is paid to the rotary seal 6 depicted in FIGS. 2 and 3.

As previously seen, the rotary seal 6 comprises a fixed first part 7 and a second part 8 able to move in terms of rotation with respect to the fixed part 7 about an axis of rotation A.

The first and second parts 7, 8 respectively comprise a first 12 and a second 13 pipe portion, these pipe portions being arranged along the axis of rotation A of the fixed and moving parts 7, 8 and in the continuation of one another so as to form a gastight continuous pipe intended to carry a pressurized gas.

The fixed part 7 comprises a tubular zone 14 that has one end 15 positioned upstream with respect to the direction in which the gases are carried B, connected to the pipe 4, and a downstream end 16 facing toward the blades 9.

The tubular zone 14 comprises an outer ring 17 serving to support a plate 18 mounted around the tubular zone 14 and attached to the ring 17 by screws 19. A cover 20 is also attached to the fixed plate 18, on the periphery thereof. The cover 20 with the fixed plate 18 delimits a volume intended to accommodate the moving part 8 and holed at the axis of rotation A, as can be seen in FIG. 2.

The moving part 8 comprises a first tubular zone 21, positioned downstream of the tubular zone 14 of the fixed part 7. The first tubular zone 21 comprises an upstream end, facing toward the fixed part and a downstream second end, facing toward the blades.

The moving part 8 is coupled to the blades of the helicopter 9, these blades forming or comprising gas-carrying pipes or ducts 10 connected to the second pipe portion 13.

More specifically, the first tubular zone 21 is connected to the pipes or ducts 10 of the blades 9 at its downstream end and, at its upstream end, faces the tubular zone 14 of the fixed part 7 so as to form a continuous gas-carrying pipe, as seen previously.

The moving part 8 further comprises a second tubular zone 22 of a larger diameter than the first 21, forming a skirt extending from the upstream end of the first tubular zone 21 and covering the downstream end of the tubular zone 14 of the fixed part 7.

The moving part 8 further comprises a plate 23 attached to the second tubular zone 22, mounted around the tubular zone 14 of the fixed part 7 and facing the fixed plate 18. The moving plate 23 together with part of the second tubular zone 22 are positioned inside the volume delimited by the cover 20, the hole 24 formed in the latter allowing the second tubular zone 22 to pass through.

As is more particularly apparent from FIG. 3, ball bearings 25 are positioned between the external wall of the tubular zone 14 of the fixed part 7 and the internal wall of the skirt 22 of the moving part 8, notably through the agency of a clamping sleeve 26 and of a spacer piece 27.

A thrust ball bearing 28 is also positioned between the cover 20 and the moving plate 23.

The fixed 7 and moving plates 8 positioned facing one another define interface zones or surfaces facing one another and nesting one inside the other.

The interface zones exhibit a plurality of coaxial annular fins 29 between them delimiting complementary annular grooves, the fins 29 of one of the fixed or moving parts interlocking in the grooves of the other part, and vice versa, leaving a clearance between the fins.

Between two successive fins and the bottom of the corresponding grooves is delimited a compression chamber C which communicates with adjacent decompression chambers C' at the edges of the fins 29.

Advantageously, the fins 29 may have a chamfered edge such that the distance between the edge of the fin and the bottom of the groove opposite it decreases away from the axis of rotation A, as depicted in FIG. 4.

This arrangement makes it possible to increase the pressure drop of gas from one decompression chamber C to the adjacent decompression chamber C'.

The interface zones extend such that they are concentric with the axis of rotation A and perpendicular to this same axis of rotation A and thus form chicanes or labyrinth seal 30 comprising a proximal zone, that is to say a zone situated in proximity to the axis of rotation, and a peripheral distal zone. The decompression chambers delimited by the fins and the grooves have a volume that increases from the axis of rotation toward the outside of the interface zones, because they occupy a circumference of increasing diameter. These decompression chambers are all concentric with the axis of rotation A of the seal.

The tubular zone of the fixed part 7 comprises transverse openings 31 opening onto the interface zones, more precisely in the proximal part thereof.

The fixed part 7 is also equipped with pressurized gas injection nozzles 32 connected to the first pipe portion 12 and opening into the space delimited by the two interface zones 30. The injection nozzles 32 are preferably located at the periphery of the corresponding interface zone 30.

The injection nozzles open into a channel, not depicted in the drawing, formed in the wall of the interface zone and extending about the axis of rotation.

According to an alternative form of embodiment, the injection nozzles may be adjustable.

The rotary seal is further equipped with means of measuring the pressure of the gases in the carrying pipe thus formed.

The gases from the generation means 3 flow through the carrying pipe 4, at a pressure which may range at least up to 15 bar and even exceed this value. The gases then successively enter the first 12 and second 13 pipe portions before finally being ejected by the ejection heads 11 of the blades 9 via the pipes or ducts 10 formed therein.

When the gases are flowing through the first pipe portion 12, some of the gases pass through the openings and are then directed toward the space delimited between the two interface zones 30. This chicane or labyrinth-shaped space creates individual pressure drops reducing the gas leak rate.

The addition of a back pressure via the injection nozzles 32 makes it possible further to limit gas leaks and forms a pressurized gas cushion or volume between the two interface zones 30. The pressure of the gases injected by the nozzle ranges between 0.5 and 0.8 bar in the example considered here.

Between the two plates 18, 23 the gases are expanded in the decompression chambers, the volumes of which increase away from the axis of rotation A, the pressure therefore decreasing away from the axis.

The gases escaping from the aforementioned volume at the peripheral zone of the plates 18, 23 are directed toward a chamber 33 delimited by the moving plate 23, the fixed cover 20 and the thrust ball bearing 28. Additional openings 34 are made in the cover 20 so as to allow the gases contained in the aforementioned 33 to escape.

According to an alternative form of embodiment that has not been depicted, these additional openings may be situated at the joining plane.

The rotary seal according to the invention, although fitted to a helicopter in the embodiment described hereinabove, may also be fitted to other types of propeller-driven craft the propellers of which are driven by the ejection of pressurized gas onto a blade of the propeller.

The rotary seal according to the invention could equally be adapted to suit turbines or compressors, so as to solve the same technical problem, namely that of ensuring satisfactory sealing or controlled leak rate at high pressures.

Figure 6:
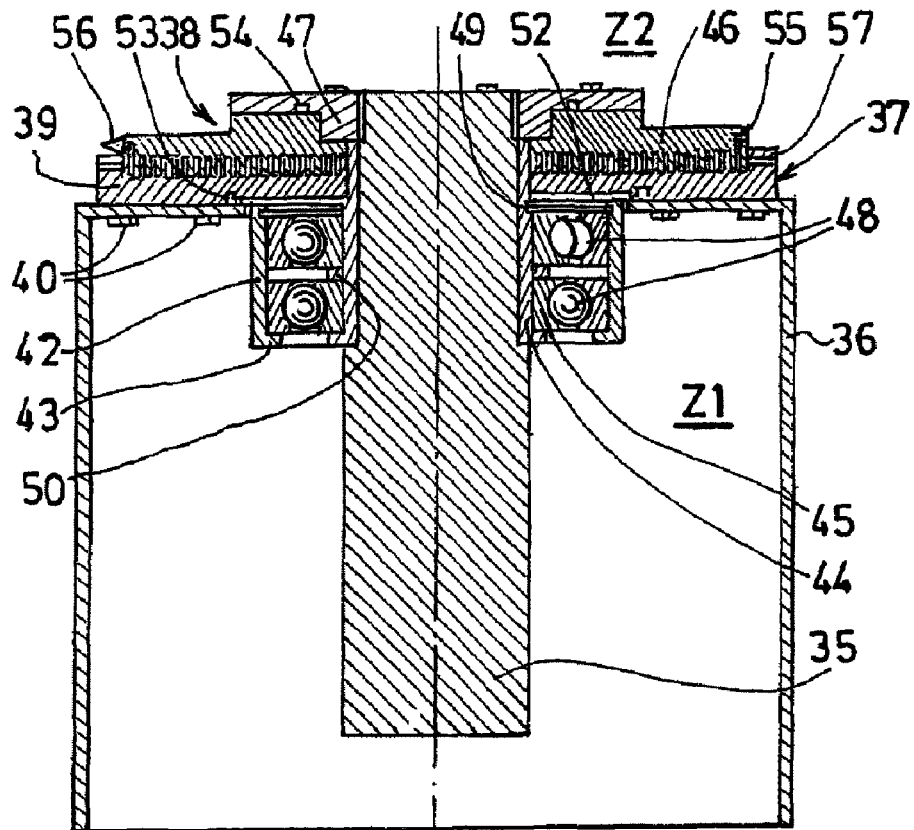
FIG. 6 is a view in section on VI-VI of FIG. 5.
Figure 5:
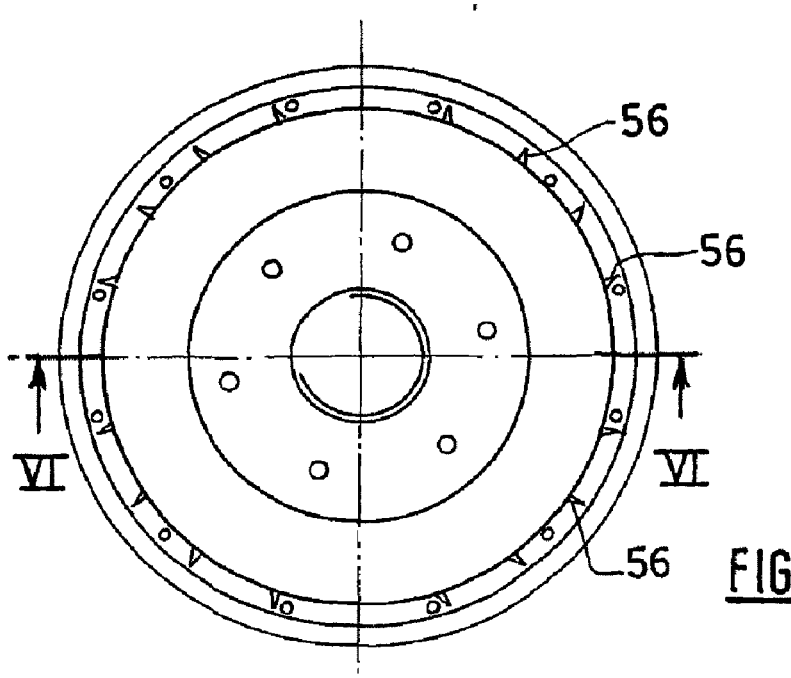
FIG. 5 is a side view of a second seal according to the invention.

Thus, according to a second embodiment depicted in FIGS. 5 and 6, a second rotary seal according to the invention is intended to be used at a turbine shaft 35 bearing depicted in part in FIG. 6. The bearing is produced in the region of the wall 36 of an enclosure delimiting an interior high-pressure zone Z1 and an exterior zone Z2 of lower pressure. It is desirable to afford satisfactory sealing or controlled leak rate between the two zones Z1, Z2 thus defined.

The rotary seal according to this second embodiment comprises a fixed first part 37 secured to the wall 36 of the enclosure and a moving second part 38 secured to the turbine shaft 35 and capable of rotational movement with respect to the fixed part 37.

By contrast with the first embodiment, the first and second parts 37, 38 comprise no pipe portions.

The fixed part 37 comprises a plate 39 mounted on the wall 36 of the enclosure having a central aperture allowing the turbine shaft 35 to pass through.

This plate 39 is attached to the wall of the enclosure by screws 40.

The fixed part 37 additionally comprises, around the central aperture in the plate 39, a rim 42 housing a ball bearing, which has a rim 43 facing toward the center of the aperture.

The moving part 38 comprises a sleeve 44 mounted around the turbine shaft 35 and also exhibiting a ball bearing housing 45.

The moving part 38 further comprises a plate 46 attached around the sleeve 44 and facing the plate 39 of the fixed part 37.

The moving part 38 finally comprises a retaining panel attached around the turbine shaft at the end thereof, in contact with the plate 46.

Ball bearings 48 are positioned between the housing rim 42 of the fixed part 37 and the housing 45 of the sleeve 44 of the moving part 38, via a clamping ring 49 and a spacer piece 50.

As in the first embodiment, the plates 39, 46 of the fixed 37 and moving 38 parts, positioned facing one another, define interface zones or surfaces that face one another and nest in one another in order to delimit decompression chambers of increasing volume which communicate with adjacent decompression chambers at the edges of the fins.

These decompression chambers are all concentric with respect to the axis of rotation A of the seal.

The fixed part of the seal comprises at least one passage for gas 52 originating from the high-pressure zone Z1 inside the enclosure toward the interface zone.

This passage 52 is created in the wall of the enclosure, in the thickness of the plate of the fixed part, until it reaches the aperture housing the turbine shaft with which aperture the interface zone communicates.

Seals 53, 54 positioned respectively between the wall 36 of the enclosure and the plate 39 of the fixed part 37, on the one hand, and between the plate 46 of the moving part 38 and the retaining panel 47, on the other hand, prevent the gas from following any path other than the intended path 52.

The plate 46 of the moving part 38 comprises gas injection means comprising ducts 55 positioned at the periphery of the plate and communicating with the exterior zone Z2, at the ends of which deflectors 56 are positioned.

Figure 7:
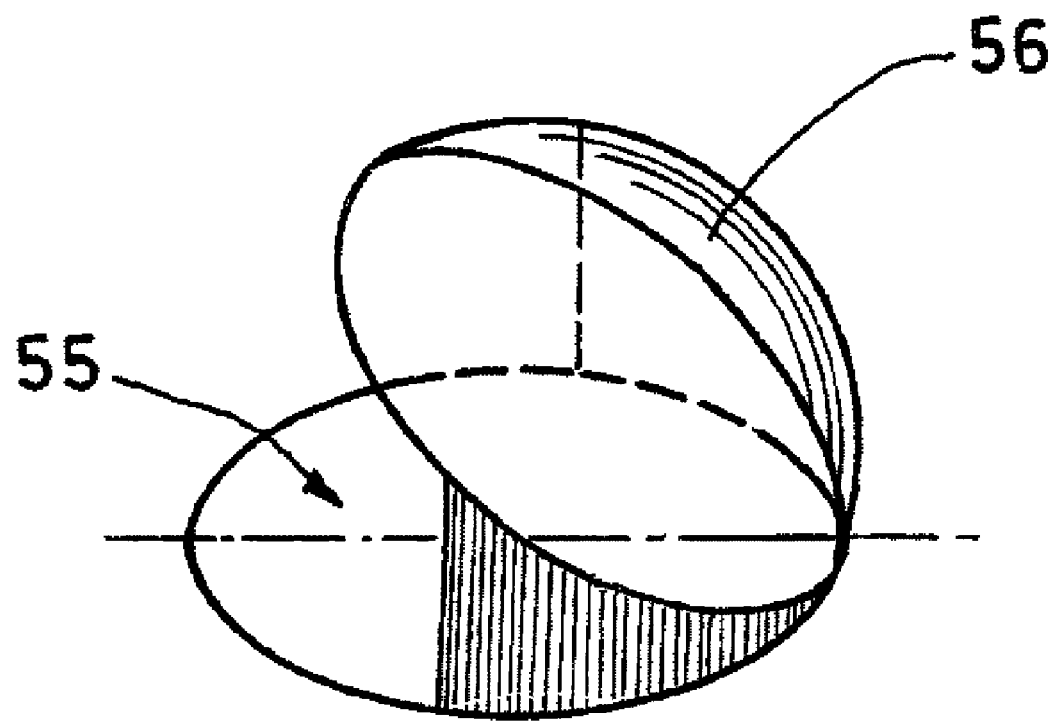
FIG. 7 is an enlarged-scale perspective view of the seal of FIG. 5.

Thus as depicted in FIG. 7, each deflector 56 is in the form of an ellipsoidal spoon the axis of which is inclined at 45° at least with respect to the exterior surface of the last decompression chamber. The presence of a deflector 56, when the shaft is rotating, causes exterior air to be compressed in the duct 55, thus creating a backpressure in the last decompression chamber.

The surface area of the cavity on the wall of last chamber is preferably equal to that of the duct.

The ducts 55 are uniformly distributed about the periphery of the edge of the plate, in communication with the last decompression chamber.

Advantageously, the sum of the surface areas of the ducts is greater than or equal to the surface area of the clearance left between the exterior wall of the last decompression chamber and the fixed part of the rotary seal.

The plate of the fixed part comprises a set of final ducts 57 connecting the end of the interface zone to the exterior zone Z2.

Figure 9:
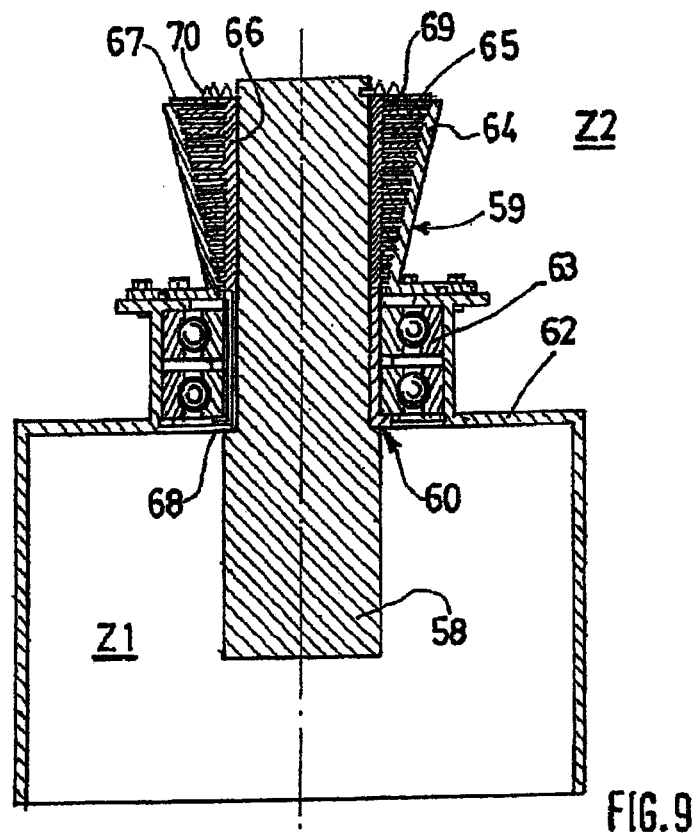
FIG. 9 is a view in section on IX-IX of FIG. 8.
Figure 8:
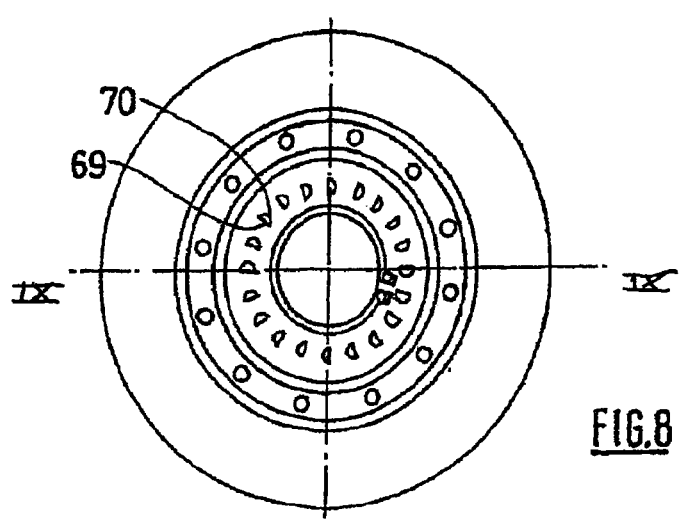
FIG. 8 is a side view of a third seal according to the invention.

According to a third embodiment depicted in FIGS. 8 and 9, a third rotary seal according to the invention is intended, like in the second embodiment, to be used to provide sealing at the bearing of a turbine shaft 58.

The rotary seal like in the second embodiment comprises a fixed first part 59 secured to the wall of the enclosure 62 and a moving second part 60 secured to the turbine shaft 58, ball bearing 63 being interposed between the first and second parts.

The fixed part 59 comprises a conical portion 64 mounted on the wall of the enclosure that has a central aperture through which the turbine shaft 58 can pass.

The internal wall of the conical portion comprises fins 65 intended to form the decompression chambers which extend such that they are perpendicular to the axis of rotation of the shaft 58 toward the center of the aperture in the conic portion. The size of the fins 65 increases away from the vertex of the cone so that the free edges of the fins are positioned on a cylinder.

The moving part 60 comprises a sleeve 66 attached to the shaft and having fins 67 attached around the shaft 58, the fins 67 extending radially with respect to the shaft 58. The size of the fins 67 increases with the distance between the shaft and the bottoms of the channels formed between two successive fins 65 of the conical portion 64 of the fixed part 59.

The conical portion 64 of the fixed part 59 and the sleeve 66 of the moving part 60, which are positioned facing one another, and which exhibit a plurality of annular fins 65, 67 extending radially with respect of the axis of the shaft 58, delimit a collection of decompression chambers which communicate with adjacent decompression chambers at the edges of the fins.

The decompression chambers run parallel to the axis of rotation A, the decompression chambers delimited by the fins and the grooves have a volume that increases from the zone of the vertex of the cone toward the base thereof, because the sizes of the fins 65, 67 and of the decompression chambers delimited thereby increase.

The fixed part 61 of the seal comprises at least one passage 68 for gases from the high-pressure zone Z1 internal to the enclosure toward the interface zone, in the region of the vertex of the conical portion 64.

The plate of the moving part for its part comprises gas injection means comprising ducts 69 and deflectors 70 which are positioned at the upper part of the second sleeve, on the periphery of the shaft, similar to those described in the second embodiment.

Figure 10:
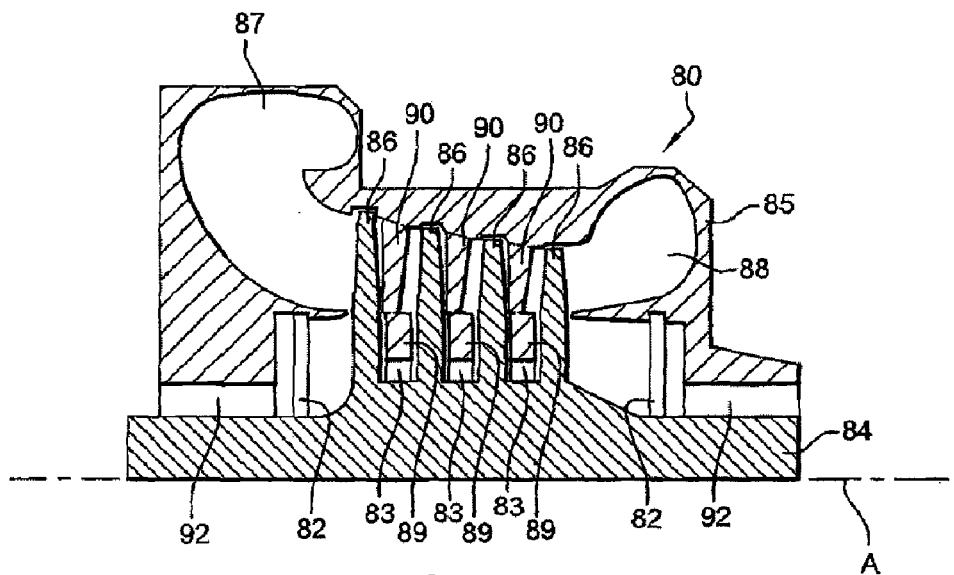
FIG. 10 is a schematic view in section of a gas turbine comprising seals according to a fourth and fifth embodiment of the invention, in part section above the axis of rotation of the turbine shaft.

FIG. 10 schematically shows, in part section, a turbine 80 equipped with seals 82, 83 according to the invention according to a fourth and fifth embodiment.

The turbine comprises a shaft 84 able to rotate about an axis A, the shaft 84 being partially housed in an enclosure 85. The shaft 84 comprises a set of blades 86, the blades 86 being intended to be rotationally driven by a pressurized gas entering the enclosure via a first opening 87 in the enclosure and leaving via a second opening 88 in the enclosure 85.

Positioned between the blades 86 are gas flow guide members 89 which are fixed relative to the enclosure 85, these flow guide members 89 having slots 90 intended to limit the turbulence of the gas flow.

Two seals 82 according to a fourth embodiment are positioned at the connection between the enclosure 85 and the moving shaft 84.

Means of mechanical connection 92, which consist for example of rolling bearings, make it possible to take up the mechanical loads and allow rotation between shaft and enclosure with a very low tolerance on axial movement.

In order to prevent gas from passing between the flow guide members 89 and the moving shaft 84 apart from through the guide slots 90, seals 83 according to a fifth embodiment of the invention are positioned between the flow guide members 89 and the shaft 84 of the turbine 80.

Figure 11:
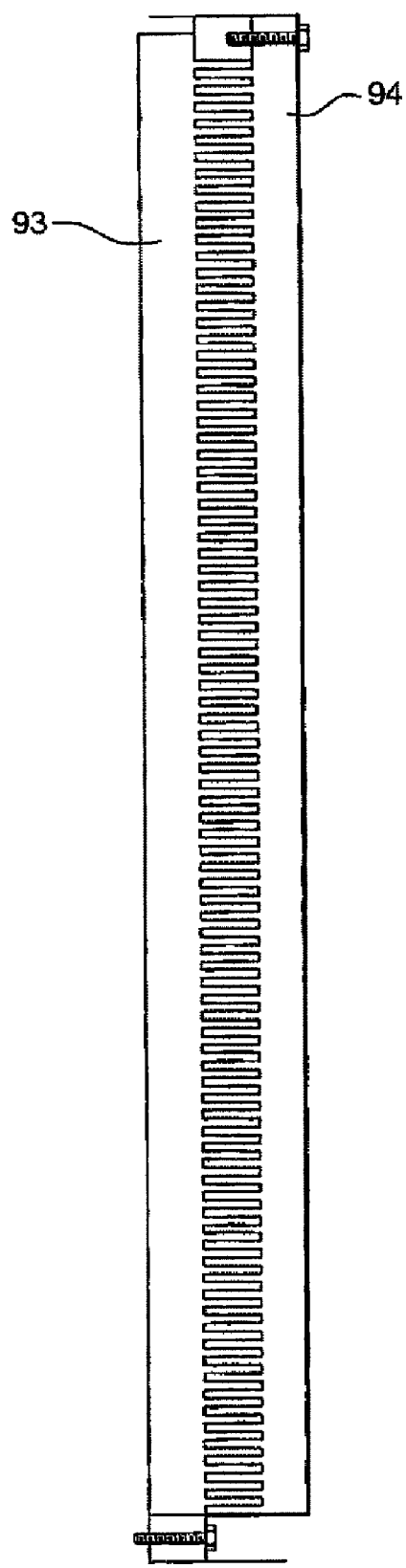
FIG. 11 is a detailed view of the seal fitted to the turbine of FIG. 10 according to the fourth embodiment.

As depicted in FIG. 11, a seal according to the fourth embodiment comprises two combs 93, 94 comprising alternations of fins and of grooves. These combs 93, 94 interlock and are able to move with respect to one another so as to form chambers of increasing volume. The interface zone defined by these combs 93, 94 extending perpendicular to the axis of rotation A.

The seal comprises two intermediate chambers 95 positioned substantially one third and two-thirds along the succession of decompression chambers, when considering the seal in the radial direction. These intermediate chambers 95 communicate upstream and downstream with the decompression chambers.

Figure 14:
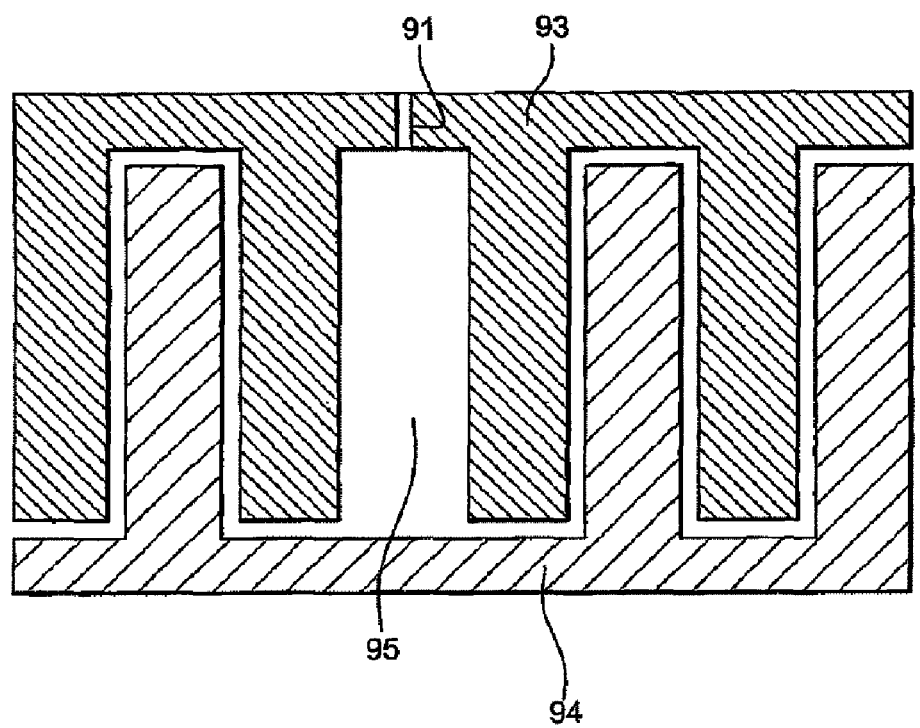
FIG. 14 is a schematic detailed view of the seal of FIG. 11.
Figure 15:
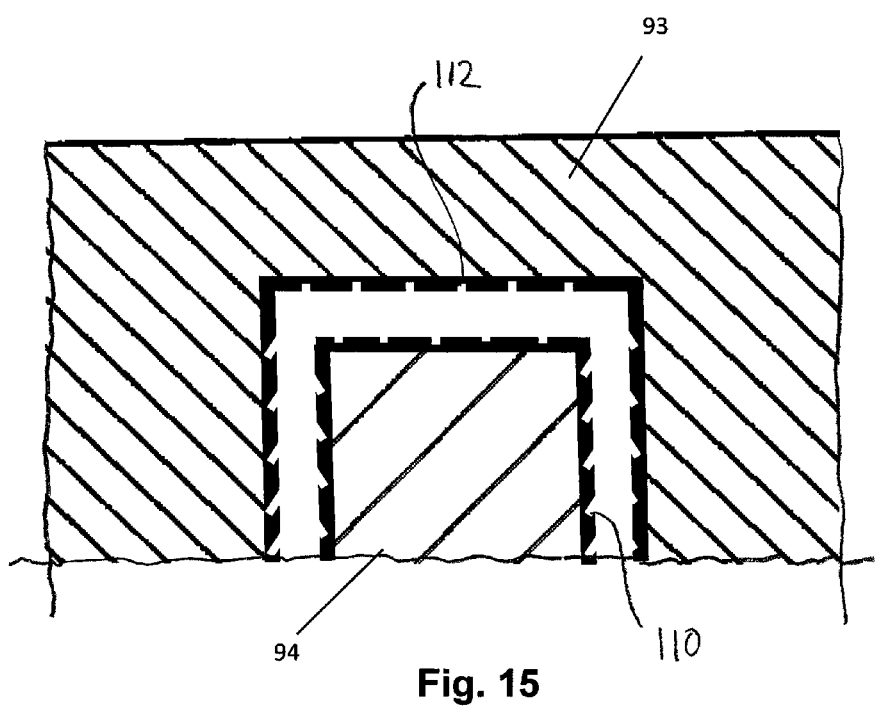
FIG. 15 is a schematic detailed view of a decompression chamber illustrated in FIG. 14.

These two intermediate chambers are not visible in FIG. 11. It is possible to produce them in the way indicated in FIG. 14 simply by omitting one fin from a comb. FIG. 14 is a schematic figure which has not been drawn to scale.

The intermediate chambers 95 allow the gases to be decompressed in a substantial ratio, corresponding substantially to the ratio of the volumes between the decompression chamber preceding the intermediate chamber, and the latter.

It is also possible, at an intermediate chamber 95, to regulate pressure, particularly using suction means 91, so as to suck in any residual leak and in this way ensure that the gas present inside the enclosure does not reach the outside.

Figure 13:
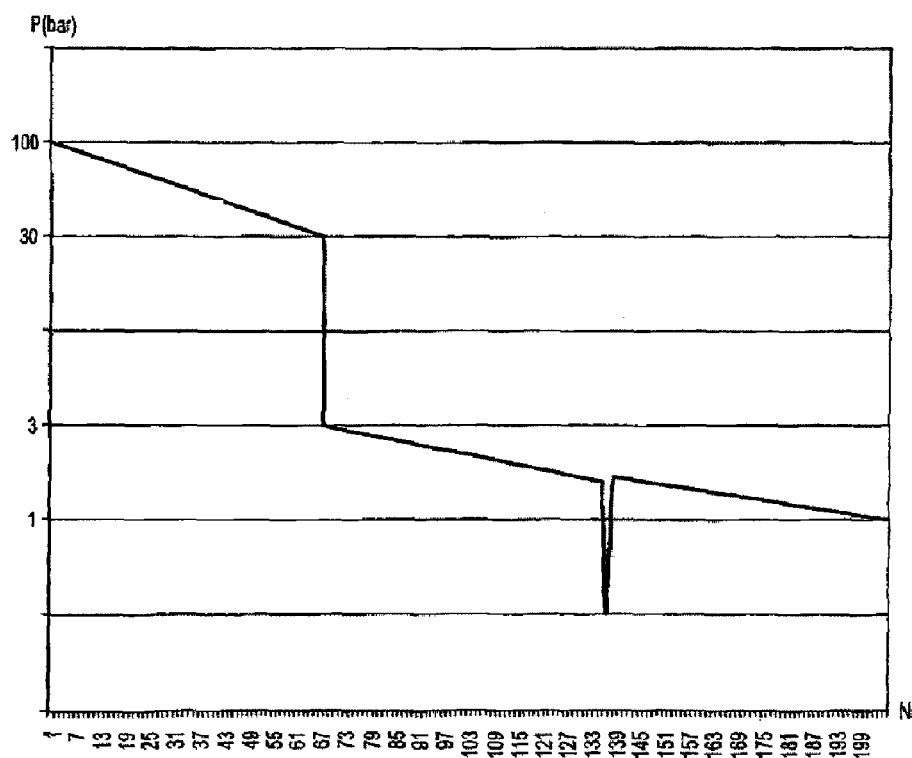
FIG. 13 is a representation of the pressure in a seal according to the fourth embodiment as a function of the position within this seal.

FIG. 13 illustrates an example based on the assumption that the pressure outside the enclosure is of the order of 1 bar and that the pressure in the enclosure of the turbine is of the order of 100 bar. The seal comprises approximately 200 decompression chambers of a volume of about 7 $cm^3$ to about 80 $cm^3$, two intermediate chambers of a volume 10 times greater than the adjacent chambers being created one third and two-thirds of the way along the succession of decompression chambers.

FIG. 13 depicts the change in pressure in the various chambers. It can be seen that the pressure at the second intermediate chamber is of the order of 0.2 bar. All that is then required is for this pressure to be maintained by aspiration in order to ensure a pressure lower than both the external pressure and the internal pressure.

Under these conditions, the enclosure and the environment outside the enclosure are completely isolated from one another.

Only a very low pressure leak rate has to be reprocessed.

These arrangements are particularly advantageous in the case, for example, of a turbine operating on a radioactive gas, for example consisting of helium, because it is best that no leaks to the external environment be generated.

It should be noted that regulating the pressure by aspirating the residual leak is not necessarily performed at an intermediate chamber. However, this choice is advantageous given the size of the chamber.

It should be noted that the positioning of the intermediate chambers and the number of them may be altered to suit each application.

In the case of the turbine of FIG. 10, a first comb 93 is secured to the flow guide members attached to the enclosure, and the second comb 94 is secured to the turbine shaft.

Figure 12:
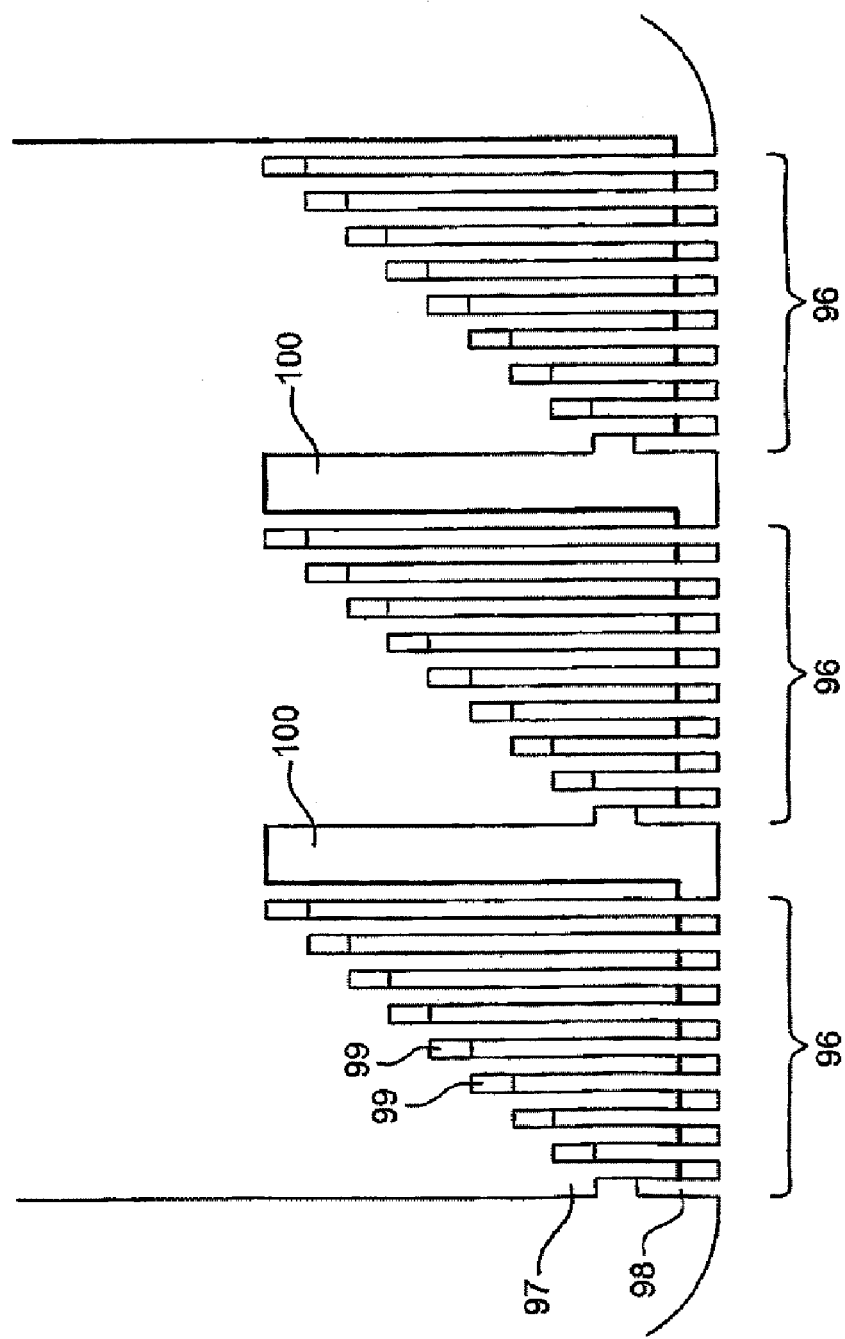
FIG. 12 is a detailed view of the seal fitted to the turbine of FIG. 10 according to the fifth embodiment.

As depicted in FIG. 12, a seal 83 according to the fifth embodiment of the invention comprises collections 96 of chambers of increasing volume formed by two combs 97, 98 comprising fins and grooves, interlocking and able to move with respect to one another. The interface zone defined by these combs 97, 98 extends in parallel to the axis of rotation.

A clearance 99 is created between the edge of the fins and the bottom of the grooves in order to allow the longitudinal expansion of the fins.

Positioned between two successive collections 96 of chambers of increasing volume is an intermediate chamber 100 the volume of which is very much greater than that of the chambers situated adjacent to the intermediate chamber and belonging to the two collections flanking it.

In the case of the turbine of FIG. 10, a first comb 97 is secured to the flow guide members attached to the enclosure, and the second comb 98 is secured to the turbine shaft.

Of course, the seal embodiments are described with reference to specific applications, but may be used for other applications.

The main applications of the invention relate, in addition to helicopters and turbines as illustrated for us with reference to the figures, to engine turbines or combustion engine gas turbines, compressed air engines, turbochargers, compressors and pumps which require a seal and/or the recovery of a leak flow.

Likewise, the seals may be used in a centrifuge, for example for uranium isotopes or any other gaseous product, in order to prevent external contamination. The seals may be used in machine tools, for example in an argon welding set comprising a rotary shaft, operating under a controlled atmosphere, particularly in clean rooms, to prevent any contamination of this controlled atmosphere.

The seals according to the invention can also be used to provide sealing on drive shafts, for example for drive shafts of airplanes, boats or submarines.

In the case of a submarine drive shaft, the purpose of using a seal is to prevent the ingress of high-pressure liquid into the seal. To this end, the seal used comprises a first part exhibiting decompression chambers of increasing volume between the interior space and an intermediate chamber, where gas is injected, followed by a second series of compression chambers of decreasing volume between the intermediate chamber and the outside. The pressurized gas injected into the intermediate chamber and compressed by the compression chambers allows the liquid to be kept outside of the submarine enclosure.

As goes without saying, the invention is not restricted to the mere embodiments of this seal that have been described hereinabove by way of examples, but on the contrary encompasses all the variant forms thereof.

In particular, if there is a desire to increase the pressure in the duct, it is possible to increase the number of decompression chambers.

The invention claimed is:

1. A rotary seal intended to separate a high-pressure first zone and a low-pressure second zone comprising:
 a first and a second part that are able to move relative to one another about an axis of rotation;
 wherein the first and second parts each comprise an interface zone exhibiting a plurality of projecting and recessed elements of complementary shapes, the projecting and recessed elements of one of the parts interlocking with the projecting and recessed elements of the other part in such a way as to form decompression chambers of a volume that increases from the high-pressure zone toward the low-pressure zone, the interface zones being located some distance from one another without rubbing together.

2. The rotary seal as claimed in claim 1, comprising at least one intermediate chamber situated between two decompression chambers, of which a volume is at once greater than the preceding decompression chamber and than the following decompression chamber.

3. The rotary seal as claimed in claim 1, wherein at least one of the two moving parts comprises gas suction means opening into a space delimited by the two interface zones.

4. The rotary seal as claimed in claim 1, wherein at least one of the two parts of the seal comprises pressurized-gas injection means opening into a space delimited by the two interface zones.

5. The rotary seal as claimed in claim 4, wherein the gas injection means are adjustable.

6. The rotary seal as claimed in claim 4, wherein the injection means are located at a periphery of the corresponding interface zone.

7. The rotary seal as claimed in claim 4, wherein the injection means open into a groove formed in a wall of the interface zone and extending over a circumference about the axis of rotation.

8. The rotary seal as claimed in claim 4, wherein the gas injection means comprise deflectors located on a moving part of the seal and intended to compress the gas through a dynamic effect.

9. The rotary seal as claimed in claim 4, wherein the gas injection means comprise at least one injection nozzle.

10. The rotary seal as claimed in claim 9, wherein the first and second parts respectively include a first and a second pipe portion, the injection nozzle or nozzles being connected to one of the first and second pipe portions.

11. The rotary seal as claimed in claim 9, wherein the first and second parts respectively include a first and a second pipe portion, the pressure of the gases injected by the injection means is less than 10% of a pressure of the gases flowing through the first and second pipe portions.

12. The rotary seal as claimed in claim 1, wherein the projecting and recessed elements are formed by annular fins between them delimiting complementary annular grooves, the fins of one of the moving parts interlocking in the grooves of the other moving part and vice versa in order to delimit the decompression chambers.

13. The seal as claimed in claim 12, wherein a clearance is left between an edge of the fins and a bottom of the grooves so as to allow for longitudinal expansion of the fins.

14. The rotary seal as claimed in claims 12, wherein the fins have an edge which, with a bottom of the groove located opposite it, forms a gradual narrowing.

15. The rotary seal as claimed in claim 1, wherein walls of the decompression chambers have roughnesses.

16. The rotary seal as claimed in claim 15, wherein the roughnesses have striations directed toward the end wall of the decompression chamber.

17. The rotary seal as claimed in claim 1, wherein the interface zones extend such that they are concentric with the axis of rotation and transverse to this same axis.

18. The rotary seal as claimed in claim 1, wherein the interface zones extend such that they are parallel to the direction of the axis of rotation.

19. The rotary seal as claimed in claim 1, wherein the first and second parts respectively comprise a first and a second pipe portion, these portions being arranged along the axis of rotation of the moving parts and in continuation of one another so as to form a gas-tight continuous pipe intended to carry a pressurized gas.

20. The rotary seal as claimed in claim 1, wherein a first part of the seal is secured to a wall of an enclosure delimiting an interior high-pressure first zone and an exterior second zone of lower pressure, and the second part is secured to a moving shaft passing through the wall of the enclosure.

21. A turbine or compressor comprising a rotary seal as claimed in claim 20.

22. A rotor for a gas engine comprising a rotary seal as claimed in claim 1.

23. A propeller-driven craft of which propellers are driven by ejection of pressurized gas onto a blade of the propeller, comprising a rotor as claimed in claim 22.

* * * * *